(12) United States Patent
Junod

(10) Patent No.: US 8,544,256 B2
(45) Date of Patent: Oct. 1, 2013

(54) GAS TURBINE ENGINE AND INTEGRATED HEAT EXCHANGE SYSTEM

(75) Inventor: Larry Allen Junod, Greencastle, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1278 days.

(21) Appl. No.: 12/214,703

(22) Filed: Jun. 20, 2008

(65) Prior Publication Data

US 2009/0314006 A1    Dec. 24, 2009

(51) Int. Cl.
*F02K 99/00*    (2009.01)
*F25B 1/00*    (2006.01)
*F04D 29/44*    (2006.01)

(52) U.S. Cl.
USPC ................................ 60/266; 415/206; 62/498

(58) Field of Classification Search
USPC ..................... 415/206; 60/266, 267; 62/199, 62/524, 525, 498, 501, 505
See application file for complete search history.

(56) References Cited

U.S. PATENT DOCUMENTS

| | | | |
|---|---|---|---|
| 2,746,269 A | 5/1956 | Moody | |
| 2,795,104 A * | 6/1957 | Zinner | 60/39.77 |
| 2,820,350 A | 1/1958 | Sheets | |
| 2,976,698 A | 3/1961 | Muffly | |
| 3,039,265 A | 6/1962 | Williams et al. | |
| 3,495,418 A | 2/1970 | Kapich | |
| 3,577,742 A * | 5/1971 | Kocher | 62/199 |
| 3,954,430 A | 5/1976 | Curtis et al. | |
| 3,956,899 A * | 5/1976 | Kronogard | 60/682 |
| 3,978,660 A | 9/1976 | Laing | |
| 4,199,961 A * | 4/1980 | Carter et al. | 62/535 |
| 4,342,200 A | 8/1982 | Lowi, Jr. | |
| 4,745,768 A * | 5/1988 | Schorr et al. | 62/238.6 |
| 4,984,432 A * | 1/1991 | Corey | 62/87 |
| 5,139,548 A | 8/1992 | Liu et al. | |
| 5,274,997 A | 1/1994 | Inoue et al. | |
| 5,791,159 A | 8/1998 | Aicher et al. | |
| 5,832,745 A | 11/1998 | Klein Nagelvoort et al. | |
| 6,460,324 B1 | 10/2002 | Rakhmailov | |
| 6,637,238 B2 | 10/2003 | Grootjans | |

(Continued)

FOREIGN PATENT DOCUMENTS

| | | |
|---|---|---|
| GB | 710 959 | 6/1954 |
| GB | 883 530 | 11/1961 |
| WO | 2007/085045 | 8/2007 |
| WO | PCT/US09/03696 | 7/2009 |

OTHER PUBLICATIONS

Extended European Search Report, EP 09767109.3, Rolls-Royce Corporation, Jul. 17, 2013.

*Primary Examiner* — Gerald Sung
(74) *Attorney, Agent, or Firm* — Krieg Devault LLP

(57) ABSTRACT

One embodiment of a heat exchange system is disclosed having a heat exchange compressor and multiple evaporators capable of operating at different heat transfer requirements. The heat exchange compressor may be a single-stage or multi-stage compressor. In one form the evaporators return working fluid in separate streams to the heat exchange compressor. The heat exchange compressor may be integrated with a gas turbine engine and includes a number of inlets that correspond to a number of separate evaporators. Each inlet can be configured to receive working fluid at different locations within a pressure and velocity flow field created in the compressor. The heat exchange compressor may be driven by a shaft of the gas turbine engine and may be positioned at a variety of locations.

17 Claims, 4 Drawing Sheets

(56) References Cited

U.S. PATENT DOCUMENTS

| | | |
|---|---|---|
| 6,866,092 B1 | 3/2005 | Molivadas |
| 6,962,060 B2 | 11/2005 | Petrowski et al. |
| 7,013,669 B2 | 3/2006 | Ophir et al. |
| 7,044,716 B2 | 5/2006 | Fabry |
| 2004/0112601 A1* | 6/2004 | Hache ............................ 166/302 |
| 2005/0223737 A1 | 10/2005 | Conry |
| 2007/0193301 A1* | 8/2007 | Andres ............................ 62/498 |
| 2011/0005244 A1* | 1/2011 | Finney et al. ....................... 62/87 |

* cited by examiner

GAS TURBINE ENGINE AND INTEGRATED HEAT EXCHANGE SYSTEM

TECHNICAL FIELD

The present invention generally relates to heat exchangers, and more particularly, but not exclusively, to heat exchangers used with gas turbine engines.

BACKGROUND

Heat exchangers capable of cooling components and/or thermal regions remain an area of interest. Some existing systems have various shortcomings relative to certain applications. Accordingly, there remains a need for further contributions in this area of technology.

SUMMARY

One embodiment of the present invention is a unique heat exchanger. Other embodiments include apparatuses, systems, devices, hardware, methods, and combinations for heat exchangers used in conjunction with gas turbine engines. Further embodiments, forms, features, aspects, benefits, and advantages of the present application shall become apparent from the description and figures provided herewith.

DETAILED DESCRIPTION OF REPRESENTATIVE EMBODIMENTS

Figure 1:
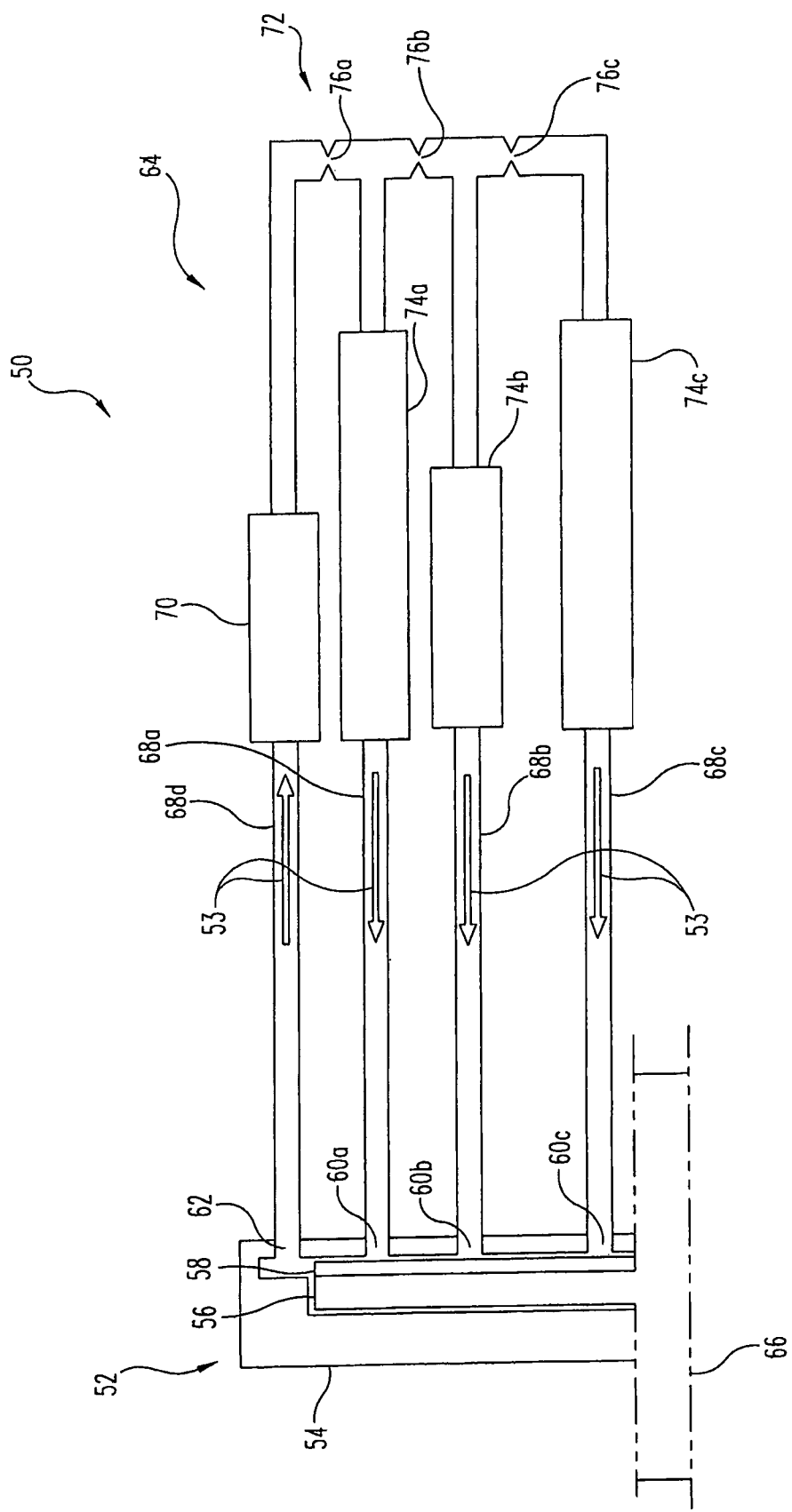
FIG. 1 depicts a schematic representation of an embodiment of a heat exchange system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a representative heat exchange system 50 is shown and is configured to exchange heat with a number of heat sources or heat sinks that may have different operating requirements. In some applications the heat sources may have a variety of temperature requirements that may be met using one or more forms of the heat exchange system 50 described herein. In one form, the heat exchange system 50 may be used to exchange heat with components used aboard an aircraft. For example, the evaporators may be used to cool control electronics, or a power control unit, to set forth just two non-limiting examples. As used herein, the term "aircraft" includes, but is not limited to, helicopters, airplanes, unmanned space vehicles, fixed wing vehicles, variable wing vehicles, rotary wing vehicles, hover crafts, and others. Further, the present inventions are contemplated for utilization in other applications that may not be coupled with an aircraft such as, for example, industrial applications, power generation, pumping sets, naval propulsion and other applications known to one of ordinary skill in the art.

The heat exchange system 50 includes a heat exchange compressor 52, which provides compression to a working fluid 53 flowing through the heat exchange system 50. In one form the heat exchange compressor 52 is a single-stage compressor or pump, but in some embodiments may be a multi-stage compressor or pump. The working fluid 53 can be a refrigerant in some embodiments. Heat exchange system 50 includes a housing 54, an impeller 56, impeller vanes 58, inlets 60, and an outlet 62, but in other embodiments may include other combinations of the same components and/or different components.

The heat exchange compressor 52 is depicted as a radial refrigerant compressor, but may take on different forms in other embodiments. The heat exchange compressor 52 is configured to receive the relatively low-pressure working fluid 53 through inlets 60, compress the working fluid 53, and eject it through the outlet 62 to be used in the heat exchange system 50.

The housing 54 contains the impeller 56 and the impeller vanes 58 and may provide one boundary of a flow path for the working fluid 53 as it flows through the heat exchange compressor 52. However, other structure may be added to form part of the flow path. In some embodiments, the housing 54 may not form any part of the flow path. The housing 54 may be constructed as a stand-alone unit that may be attached to various components of a gas turbine engine, but in some embodiments, the housing 54 may be integrated into a gas turbine engine.

The impeller 56 includes the impeller vanes 58 and is spun at a rotational velocity such that the working fluid 53 traversing through the housing 54 is compressed by the action of the impeller 56 and the impeller vanes 58. The impeller 56 may take on any suitable form useful in compressing the working fluid 53 as will be understood by those skilled in the art. To set forth just one non-limiting example, the impeller 56 may be a centrifugal impeller. The impeller 56 and the impeller vanes 58 create a pressure and velocity flow field distribution within the housing 54 when the impeller 56 and the impeller vanes 58 are caused to rotate by an engine shaft 66. The pressure and velocity flow field distribution within the housing 54 may vary depending upon the rotational rate of the engine shaft 66, the mass flow rates into and out of the housing 54, as well as other properties such as temperature and pressure, among possible others.

The inlets 60 provide a return path through which the working fluid 53 may pass after it has traversed heat exchange circuit 64. Three inlets are depicted in the illustrated embodiment, but additional or fewer inlets may be configured in other embodiments. Furthermore, the inlets 60 can be sized to receive varying mass flow rates of the working fluid 53. For example, in one non-limiting form inlet 60a may be configured to receive a greater mass flow rate of working fluid 53 than inlet 60b, which furthermore can be configured to receive a mass flow rate greater than inlet 60c. The inlets 60 can be configured to receive working fluid 53 at a variety of temperatures and/or pressures.

In one form, the inlets 60 are arranged such that inlet 60a is radially outward of inlet 60b, which is located radially outward of inlet 60c. In some embodiments, multiple inlets 60 may occupy similar radial locations but otherwise be circumferentially offset. Though only three inlets are shown, some embodiments may include fewer or more inlets. The inlets 60 return at different pressure and/or locations within a pressure and velocity flow field present in the heat exchange compressor 52 when the impeller 56 and the impeller vanes 58 are caused to rotate by the engine shaft 66. The inlets 60 may be arranged in relation to the pressure field of the impeller 56 and the impeller vanes 58 such that the pressure of the working fluid 53 in conduits 68a, 68b, and 68c that is returning to the heat exchange compressor 52 may be higher than the pressure of the working fluid 53 within the housing 54 in proximity to the inlets 60. An intermediate pump could be provided in some embodiments to elevate the pressure of the working fluid 53 before entering the pressure field within the housing 54, if the original pressure in the conduits 68 was lower than that within the housing 54.

The outlet 62 provides a conduit through which the working fluid 53 may pass after it has been compressed by the heat exchange compressor 52. In the illustrative embodiment, the outlet 62 is configured radially outward from the inlets 60, but in other forms the outlet 62 may be configured at other locations relative to the inlets 60. Only one outlet 62 is depicted in the illustrated embodiment, but the heat exchange system 50 may have any number of other outlets in other embodiments as may be needed by a particular application.

One form of the heat exchange circuit 64 further includes the conduits 68a, 68b, 68c, and 68d, a condenser 70, an expander 72, and evaporators 74. The conduits 68a, 68b, 68c, and 68d are configured to convey the working fluid 53 between the housing 54 and the condenser 70 and evaporators 74a, 74b, and 74c. In some embodiments, one or more valves may be configured with the conduits 68 to selectively shut down or otherwise meter the flow through the conduits. The conduits 68 may be sized to contain the working fluid 53 at any variety of temperatures and pressures. The conduits 68a, 68b, and 68c may flow working fluid in generally the same direction, much like a parallel electric circuit. The condenser 70 is configured to cool the working fluid 53 after it has been compressed with the heat exchange compressor 52.

The expander 72 is depicted in the illustrative embodiment as a single device having a cascade of expansion orifices 76. In other forms, however, multiple devices may be configured together to form the expander 72. The expander 72 may expand the working fluid 53 in any number of separate streams, though only three are depicted in the illustrative embodiment. In some forms the expander 72 may only expand the working fluid 53 into a single stream. The expansion orifices 76 are configured to expand the working fluid 53 to varying temperatures and pressures. In some forms, however, the expansion orifices 76 may be configured to cool the working fluid 53 to similar temperatures but different pressures. Expansion orifice 76a is configured to expand the working fluid 53 from a first temperature and pressure downstream of the condenser 70 to a second temperature and pressure upstream of evaporator 74a as well as upstream of expansion orifice 76b. Expansion orifice 76b, in turn, may be configured to further expand the working fluid 53 to another temperature and pressure relative to the working fluid 53 upstream of expansion orifice 76b. Likewise, expansion orifice 76c may be configured to further expand the working fluid 53 to a yet a different temperature and pressure relative to the temperature and pressure upstream of expansion orifice 76c.

The working fluid 53 enters the expander 72 and is expanded in a serial fashion to varying temperatures and pressures; the working fluid 53 is also split between streams that enter one of the evaporators 74, and a stream that continues through the expander 72 to be further expanded by downstream expansion orifices 76. Although the expander 72 may operate to expand and split the working fluid 53, in some forms additional devices and/or structure may be provided to split the working fluid 53 such that the expander 72 is limited to expanding the flow. Evaporators 74 may be used to cool various components or regions having different thermal requirements. For example, the working fluid 53 exiting expansion orifice 76a may be at a higher temperatures and pressure than the working fluid 53 exiting expansion orifice 76c. In this way, evaporator 74a may be configured to cool a component having different heat transfer requirements than evaporator 74c, which may be configured at the lowest temperature and pressure thereby cooling a heat component or a region that may have stricter heat transfer requirements. Any number of evaporators 74 may be used in various embodiments. In some forms, the evaporators 74 may be used to cool components or regions having similar thermal requirements. In some further embodiments, the working fluid exiting the expansion orifices 76 may be further conditioned to have a similar temperature entering each of the evaporators 74. In one form, heater blankets may be added to condition the working fluid exiting the expansion orifices 76.

After the working fluid 53 has exited each of the evaporators 74 it is returned to various locations of the housing 54. In one form, the working fluid 53 may be returned to various radial locations of the housing 54. The working fluid 53 may be received within the housing 54 at various pressure and/or velocity distribution locations caused by the rotation of the impeller 56 and the impeller vanes 58.

Figure 2:
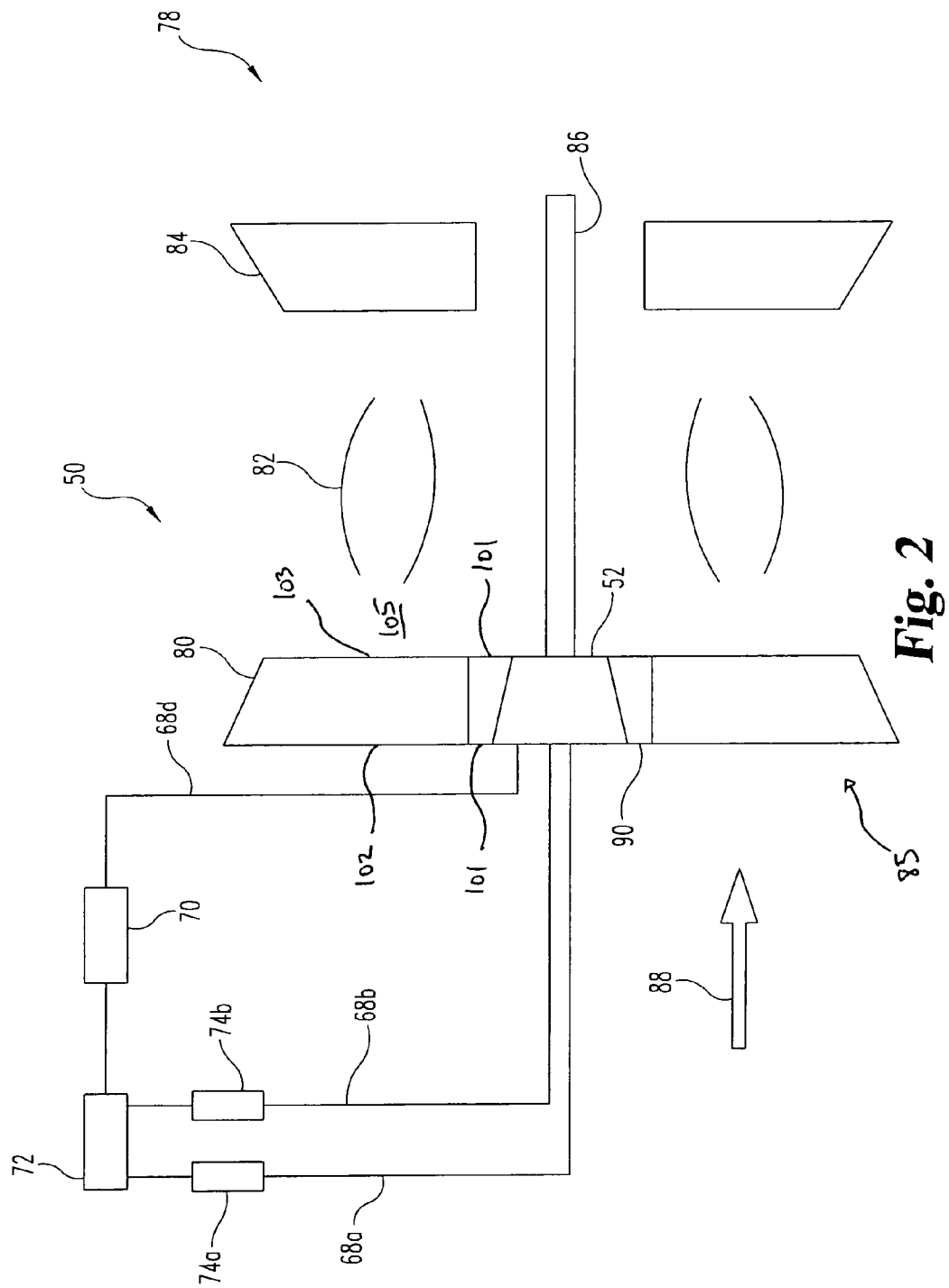
FIG. 2 depicts a schematic representation of another embodiment of a heat exchange system integrated with a gas turbine engine.

Turning now to FIG. 2, one embodiment of the heat exchange system 50 is shown integrated with one embodiment of a gas turbine engine 78. Though the gas turbine engine 78 is depicted as an axial flow engine, other types of engines can also be used such as radial flow engines and mixed radial-axial flow engines. The gas turbine engine 78 includes a compressor 80, a combustor 82, and a turbine 84. A shaft 86 connects the turbine 84 to the compressor 80. Airflow 88 entering the gas turbine engine 78 is compressed by the compressor 80 and is mixed with fuel before being burned in the combustor 82. The turbine 84 extracts energy from the flow stream exiting the combustor 82. As the turbine 84 extracts energy from the flow stream it provides rotational energy to the shaft 86 which in turn rotates the compressor 80. The gas turbine engine 78 depicted in FIG. 2 is a turbojet engine, but other types of gas turbine engines having a variety of configurations are also contemplated herein. To set forth just one non-limiting example, the gas turbine engine 78 may have a two-stage spool that drives a fan.

The heat exchange compressor 52 is depicted in the embodiment described in FIG. 2 as being located within a rotating turbomachinery 85 of the gas turbine engine 78, and in particular is disposed within a rotor 90 of the compressor 80. As used herein, the term "turbomachinery" includes either compressors or turbines, or both. The heat exchange compressor 52 is shown receiving a working fluid through conduits 68a and 68b, but it will be appreciated that the heat exchange compressor 52 may receive fewer or more than two conduits. In some embodiments the heat exchange compressor 52 may receive only one conduit such that the heat exchange compressor 52 has only one inlet. In some forms, however, the heat exchange compressor 52 may have multiple inlets, but less than all inlets may receive working fluid from a conduit. For example, the heat exchange compressor 52 may have three inlets, but only two conduit 68a and 68b. Other variations are also contemplated herein.

Though the compressor 80 of the illustrative embodiment is shown having only one rotor, some embodiments may contain any number of additional rotors. Though the illustrative embodiment depicts the heat exchange compressor 52 disposed within the compressor 80, other embodiments may include the heat exchange compressor 52 disposed within a rotor of the turbine 78. The heat exchange compressor 52 is coupled to the rotor 90 in the illustrative embodiment, but in other embodiments it may be integrally formed with the rotor 90.

An outer shape 101 of the heat exchange compressor 52 may be disposed within axial boundaries 102 and 103 of the rotor 90, but in some forms the heat exchange compressor 52 may protrude past one or both of the axial boundaries 102 and 103. In other forms, the heat exchange compressor 52 may be within axial boundaries of a combination of the rotor 90 and blades attached to the rotor 90. In still other forms, the outer shape 101 of the heat exchange compressor 52 may be entirely displaced to either side the axial boundaries 102 and 103 of the illustrated embodiment such that the heat exchange compressor 52 is not limited by the rotor 90.

In some forms, the heat exchange compressor 52, furthermore, may be disposed radially inwardly of a flow path through the gas turbine engine 78. For example, the heat exchange compressor 52 may be disposed radially inward of a flow path 105 which is capable of conveying compressed air from the compressor 80 to the combustor 82. The heat exchange compressor 52 may be disposed radially inwardly of other flow paths which may, or may not, form part of a core of the gas turbine engine 78. In other forms, the heat exchange compressor 52 may be disposed radially outward of a flow path of the gas turbine engine 78. In short, the heat exchange compressor 52 may be located at a variety of locations within the gas turbine engine 78.

The gas turbine engine 78 may include a number of heat exchange compressors 52, each of which may be placed at a variety of locations. In such embodiments, additional conduits and heat exchangers may be added to provide for other cooling circuits. In still further embodiments, the heat exchange compressor 52 may be disposed across multiple rotors, or may be disposed between multiple rotors. It is also contemplated herein that a single rotor 90 may also contain more than one heat exchange compressor 52.

The heat exchange compressor 52 may be rotated at the same rate as that of the compressor 80, but in some embodiments a gearing (not shown) may be coupled to the shaft 86 such that heat exchange compressor 52 rotates at a different rate than the compressor 80.

The working fluid 53 may be compressed by the heat exchange compressor 52 and thereafter flow through conduit 68d and be condensed by the condenser 70. After flowing from the condenser 70, the working fluid 53 is passed through the expander 72 and the evaporators 74, at which point it is returned to the heat exchange compressor 52 via the conduits 68.

Figure 3:
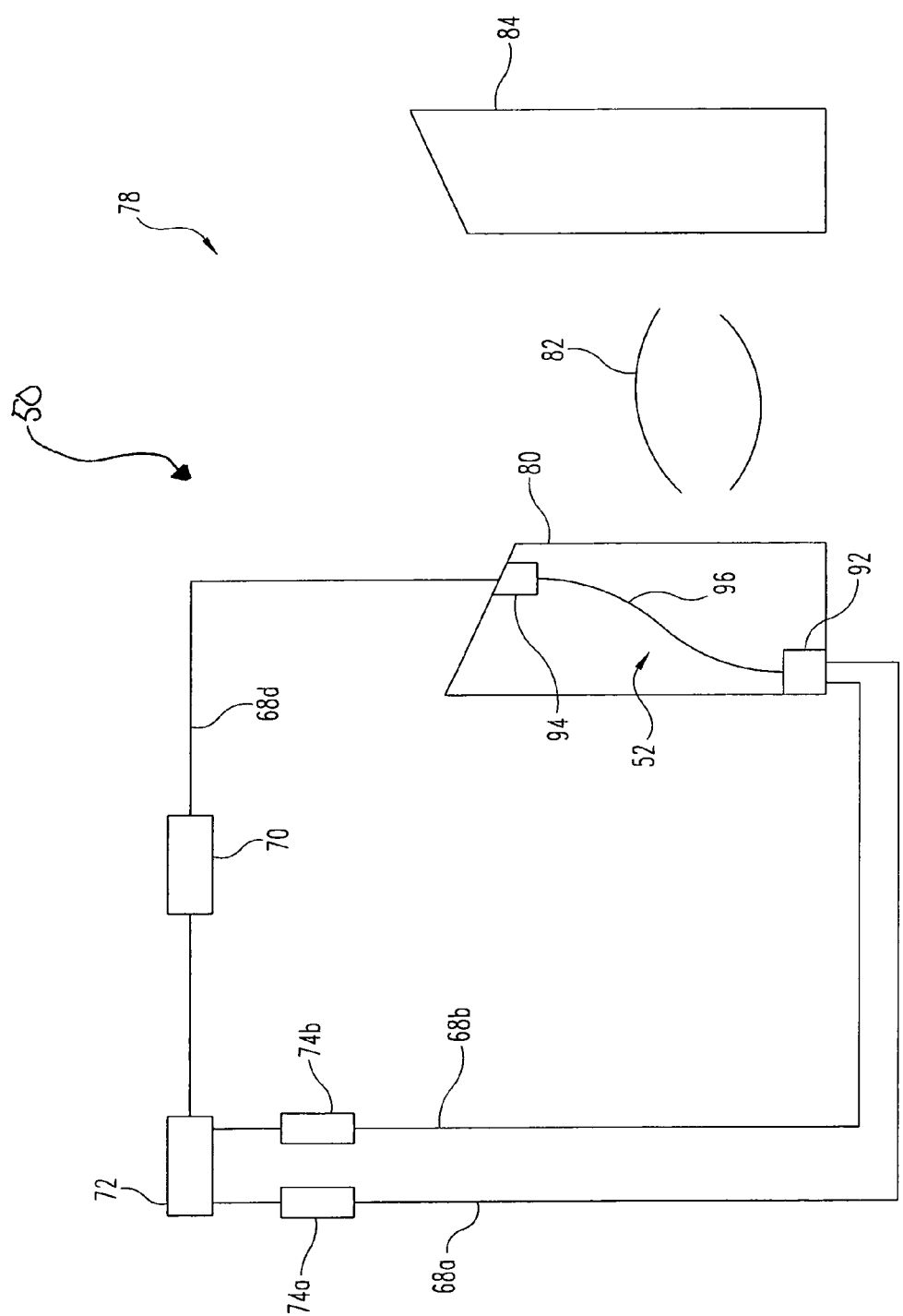
FIG. 3 depicts a schematic representation of yet another embodiment of a heat exchange system.

Turning now to FIG. 3, a partial schematic representation of the heat exchange system 50 is shown incorporated into the gas turbine engine 78. The heat exchange compressor 52 in the embodiment depicted in FIG. 3 includes plenums 92 and 94 and a conduit 96 connecting the plenums 92 and 94. In some forms, however, the plenums 92 and 94 may not be needed. As the working fluid 53 is returned through the conduits 68 to the heat exchange compressor 52, the working fluid 53 may be collected in the plenum 92 and then routed through the conduit 96 to the plenum 94. The rotation of the compressor 80 causes the working fluid 53 to be compressed as it traverses from the hub end of the compressor 80 to its tip end. It will be understood that higher rotational rates of the compressor 80 may result in higher pressurization of the working fluid 53 as it arrives in the tip end of the compressor 80.

The conduit 96 is formed in a blade of the compressor 80 and may have any variety of path shapes and cross sectional shapes. The plenum 94 may be located within the same blade that the conduit 96 traverses or may be located off of the blade in a shroud, casing, or other structure of the compressor 80.

The working fluid 53 flows from the heat exchange compressor 52 through conduit 68d and is condensed by the condenser 70. In one form, working fluid 53 may be offloaded from the blade of the compressor 80 through a rotating tip shroud (not depicted). A radially-outboard surface of the rotating tip shroud may be used in some embodiments to form a wall of the plenum 94 to collect the compressed refrigerant from the conduit 96. The working fluid 53 is furthermore conveyed to the expander 72 at which point it is expanded at various temperatures and pressures through a multitude of expansion orifices, among other mechanisms, and is then routed through the evaporators 74. The evaporators 74 operate at different temperatures and can cool different components or temperature regions within the gas turbine engine 78 or other structure, such as an aircraft. It will be appreciated that the evaporators 74 may operate at a similar temperature if appropriate pre-conditioning is performed on the working fluid 53 prior to entering the evaporators 74. The evaporators 74 may be used to exchange heat with components or temperature regions having different heat transfer requirements.

Figure 4:
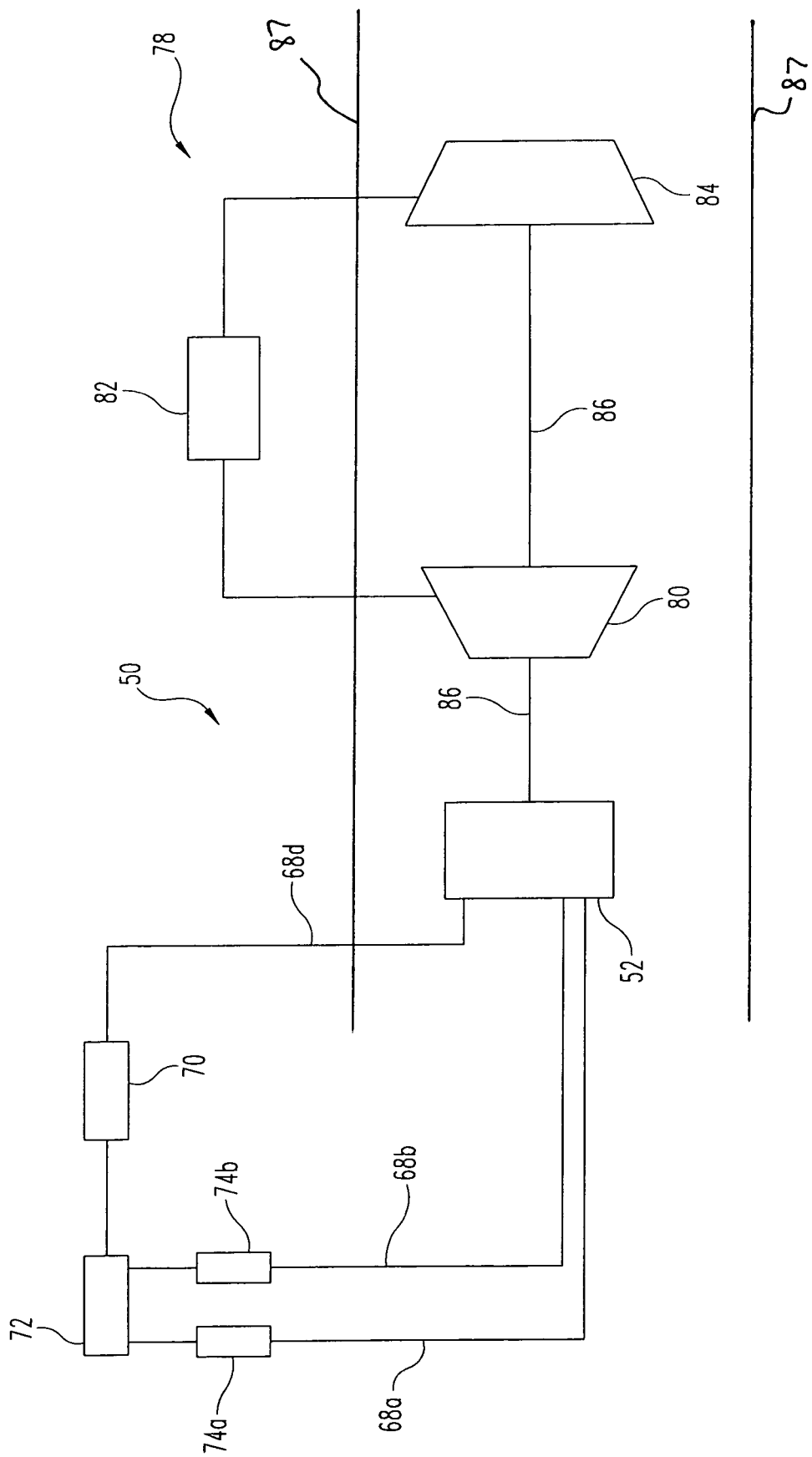
FIG. 4 depicts a schematic representation of a further embodiment of a heat exchange system.

Turning now to FIG. 4, the gas turbine engine 78 is shown connected to the heat exchange system 50. The gas turbine engine 78 in the illustrative embodiment includes the centrifugal compressor 80, the combustor 82, and the turbine 84, but may also include other gas turbine engine components. Though the illustrative embodiment in FIG. 4 depicts the centrifugal compressor 80, in some forms the gas turbine engine may have an axial flow compressor and/or an axial flow turbine. The shaft 86 connects the turbine 84 to the compressor 80 and provides the power necessary to compress an airflow entering the gas turbine engine 78. The shaft 86 also provides power to the heat exchange compressor 52, but some embodiments may include an additional shaft disposed between the shaft 86 and the heat exchange compressor 52 that is used to drive the heat exchange compressor 52. The additional shaft may be connected with the shaft 86 at a point between the compressor 80 and the turbine 84, or on either side of the compressor 80 or the turbine 84. Such an additional shaft may be referred to as a power take-off shaft, as an example, and may be aligned in the same direction as the shaft 86 or at an angle relative to the shaft 86. In some forms the power take-off shaft 86 may extend across one or more flow paths within the gas turbine engine 78. In some embodiments a gearbox may be used to couple the additional shaft to the shaft 86 to speed up or reduce the rotational rate of the heat exchange compressor 52 to the shaft 86.

The compressor 52 is coupled to the gas turbine engine 78 which provides power necessary to compress the working fluid 53 and route it through the heat exchange system 50. In the illustrative form, the compressor 52 is located within gas turbine engine housing 87, but in some embodiments the compressor 52 may be located outside of the gas turbine engine housing 87. The gas turbine housing may take on a variety of forms including, but not limited to, a gas turbine engine casing. In one form the gas turbine engine housing 87 may form an intake and an exhaust for the gas turbine engine 78. In another form the housing 87 may be an integrated assembly, and in further forms may be unitary. In one non-limiting example, the compressor 52 may be located within the gas turbine engine housing 87 and either outward or inward of an air flow path within the gas turbine engine 78. For example, the compressor 52 may be located axially outward, axially inward, radially outward, or radially inward of an air flow path within the gas turbine engine 78. The gas turbine engine housing 87 may enclose the gas turbine engine components such as the centrifugal compressor 80, the combustor 82, and the turbine 84, but in some forms the gas turbine engine housing 87 may only partially enclose one or more of the gas turbine engine components.

As described in other embodiments hereinabove, the working fluid 53 traverses through conduit 68d and is condensed by the condenser 70 at which point it flows to the expander 72. The expander 72 includes a mechanism which may expand the working fluid 53 to a variety of temperatures and pressures, and furthermore may split the working fluid 53 into multiple streams. The working fluid 53 is routed through the evaporators 74a or 74b at which point the working fluid 53 may be used to cool a temperature component or temperature region. After flowing through the evaporators 74a and 74b, the working fluid 53 flows through the conduits 68a and 68b and is returned to the heat exchange compressor 52. Though only two evaporators 74a and 74b and two conduits 68a and 68b are depicted in the embodiment shown in FIG. 4, other embodiments may include additional or fewer evaporators and conduits.

One example of the present application includes a heat exchange system having a single-stage pump and/or compressor integrated within a gas turbine engine. The single-stage pump is disposed within the rotor of an axial flow compressor. The single-stage pump rotates at the same rate as the axial flow compressor and delivers compressed working fluid to a condenser and from there to an expander. The expander is configured having a number of cascaded expansion orifices that are arranged to deliver expanded working fluid at decreasing temperatures and pressures, in separate streams, to evaporators positioned downstream of the expander. Each evaporator is configured to cool a different component or region having unique heat transfer requirements. After the working fluid traverses each evaporator it is returned in separate streams to the single-stage compressor. A number of inlets are configured in the single-stage compressor to receive the working fluid returning from the evaporators. Each inlet is configured to receive the working fluid and deliver it to different pressure locations within a pressure field created when the single-stage compressor is in operation.

In one embodiment of the present application, there is an apparatus comprising a gas turbine engine and a heat exchanger compressor. The gas turbine engine has a rotor driven by a shaft of the gas turbine engine. The heat exchanger compressor is operable to compress and discharge a heat exchanger working fluid and includes at least two inlets configured to receive a return flow of the discharged heat exchanger working fluid. The heat exchanger compressor is coupled to the shaft of the gas turbine engine.

In another embodiment of the present application, there is an apparatus comprising a gas turbine engine, a gas turbine engine housing, and a heat exchange pump. The gas turbine engine has a compressor, a combustor, and a turbine. The gas turbine engine housing at least partially encloses the compressor, the combustor, and the turbine. The heat exchange pump is disposed within the housing and is operable to compress a heat exchange working fluid.

In yet another embodiment of the present application, there is an apparatus comprising a gas turbine engine and a heat exchange system. The gas turbine engine has a compressor and a turbine. The heat exchange system is coupled with the gas turbine engine, and has a condenser, an expander, several evaporators, and a means for compressing a refrigerant. The condenser is operable to withdraw heat from a refrigerant. The expander is disposed downstream of the condenser and is operable to expand multiple, separate streams of the refrigerant. Several evaporators are in fluid communication with the expander and are operable to receive individual streams of the multiple, separate streams. The means for compressing the refrigerant is driven by and disposed within the gas turbine engine.

In further embodiment of the present application, there is a method comprising: removing heat from a working fluid as it flows through a condenser, expanding the working fluid to an expanded temperature and pressure, transferring heat between a medium and the working fluid, returning the working fluid to a compressor, mechanically powering a heat exchanger compressor by drivingly coupling the heat exchanger compressor to a gas turbine engine shaft; and compressing the working fluid.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising: a gas turbine engine having a compressor rotor, a compressor for compressing air supplied to the gas turbine engine, and a shaft, the compressor rotor driven by the shaft at an axial shaft location; a heat exchanger compressor operable to compress and discharge a heat exchanger working fluid, wherein the heat exchanger compressor includes at least two inlets configured to receive a return flow of the heat exchanger working fluid; and wherein the heat exchanger compressor is connected to rotate with the shaft at the axial shaft location of the compressor rotor such that the heat exchanger compressor is located within the compressor or the compressor rotor.

2. The apparatus of claim 1 wherein the heat exchanger compressor is located radially inward of a flow path affected by the compressor rotor and is located outside of the compressor rotor.

3. The apparatus of claim 1 which further includes:
   a condenser operable to receive the working fluid from the heat exchanger
   an expander located downstream of the condenser and operable to provide the working fluid to at least two heat exchangers; and
   wherein the working fluid is returned to the heat exchanger compressor after exchanging heat with the at least two heat exchangers.

4. The apparatus of claim 3 wherein the at least two heat exchangers are operable to cool components having different heat transfer requirements.

5. The apparatus of claim 1 wherein the heat exchanger compressor is operable to produce a flow path having a pressure and velocity distribution, and wherein the at least two inlets are located at different flow path locations.

6. The apparatus of claim 5 wherein the different flow path locations correspond to different pressure locations within the pressure and velocity distribution.

7. The apparatus of claim 1 wherein the heat exchanger compressor is a single stage compressor.

8. An apparatus comprising: a gas turbine engine having a compressor, a combustor, and a turbine; a gas turbine engine housing at least partially enclosing the compressor, the combustor, and the turbine; and a heat exchanger pump disposed within the housing, the heat exchanger pump operable to compress a heat exchange working fluid; wherein the heat exchanger pump in located to rotate within one of the compressor and turbine during operation of the gas turbine engine.

9. The apparatus of claim 8 further comprising:
a gas turbine engine rotor having blades operable to affect a pressure change in an airflow flowing through a flow path of the gas turbine engine; and
the heat exchange pump disposed inward of the flow path.

10. The apparatus of claim 9 wherein the gas turbine engine includes an axial compressor, wherein the heat exchange pump is located radially inward of a flow path through the axial compressor, and wherein the heat exchange pump is a refrigerant compressor.

11. The apparatus of claim 8 wherein the heat exchange pump is a single-stage compressor.

12. The apparatus of claim 8 wherein the heat exchange pump is integrally formed with a gas turbine engine rotor.

13. The apparatus of claim 8 which further includes at least two inlets that provide the working fluid to the heat exchange pump.

14. The apparatus of claim 13 wherein the working fluid is returned in parallel to the heat exchange pump downstream of separate heat exchangers.

15. The apparatus of claim 14 wherein the heat exchange pump has an internal pressure distribution when operating, and wherein the working fluid is returned from the separate heat exchangers to different locations within the internal pressure distribution.

16. The apparatus of claim 14 wherein the working fluid entering the first of the separate heat exchangers is at a different pressure than the working fluid entering the second of the separate heat exchangers.

17. An apparatus comprising: an open cycle gas turbine engine having an annular flow path through a compressor, a combustor, and a turbine, wherein the annular flow path includes a radially outer extent and a radially inner extent; a heat exchange system coupled with the gas turbine engine, the heat exchange system having: a condenser operable to withdraw heat from a refrigerant; an expander disposed downstream of the condenser and operable to expand multiple, separate streams of the refrigerant; several evaporators in fluid communication with the expander and operable to receive individual streams of the multiple, separate streams; and means for compressing the refrigerant, the means driven by and disposed at an axial station within one of the compressor and turbine and is located inward of the radially outer extent of the annular flow path within the gas turbine engine.

* * * * *